US009010217B2

(12) United States Patent
Chen et al.

(10) Patent No.: US 9,010,217 B2

(45) Date of Patent: Apr. 21, 2015

(54) BICYCLE PEDALS WITH LOCKING FUNCTION

(71) Applicant: Shu-Te University, Kaohsiung (TW)

(72) Inventors: Wen-Liang Chen, Kaohsiung (TW); Ying-Liang Yao, Kaohsiung (TW)

(73) Assignee: Shu-Te University, Kaohsiung (TW)

( * ) Notice: Subject to any disclaimer, the term of this patent is extended or adjusted under 35 U.S.C. 154(b) by 84 days.

(21) Appl. No.: 13/728,152

(22) Filed: Dec. 27, 2012

(65) Prior Publication Data

US 2014/0144286 A1 May 29, 2014

(30) Foreign Application Priority Data

Nov. 28, 2012 (TW) ............................ 101144550 A

(51) Int. Cl.
*B62M 3/00* (2006.01)
*B62M 3/08* (2006.01)

(52) U.S. Cl.
CPC ............... *B62M 3/08* (2013.01); *Y10T 74/2168* (2013.01)

(58) Field of Classification Search
USPC ........ 74/594.1, 594.4, 594.7; 280/259, 288.4, 280/294; 70/225, 226, 233, 234
See application file for complete search history.

(56) References Cited

U.S. PATENT DOCUMENTS

| | | | | |
|---|---|---|---|---|
| 609,127 | A * | 8/1898 | Stearns | 70/236 |
| 625,986 | A * | 5/1899 | Pennock | 74/594.1 |
| 3,774,421 | A * | 11/1973 | Stephens, Jr. | 70/234 |
| 4,417,745 | A * | 11/1983 | Shomo | 280/287 |
| 5,458,022 | A * | 10/1995 | Mattfeld et al. | 74/594.1 |
| 8,689,663 | B2 * | 4/2014 | Weber | 74/594.4 |

FOREIGN PATENT DOCUMENTS

| | | | |
|---|---|---|---|
| CN | 103569244 | A * | 2/2014 |
| DE | 102011013250 | A1 * | 9/2012 |
| JP | 2005170363 | A * | 6/2005 |
| NL | 1009749 | C2 * | 2/2000 |

* cited by examiner

*Primary Examiner* — Vicky Johnson

(57) ABSTRACT

A bicycle pedal with a locking function has a base and a securing member. The base is positioned on a side of the bicycle and has a U-shaped main body and a through hole disposed on the main body. The securing member has a securing rod with an end attached to the bicycle and disposed through the through hole, and a stopping portion disposed at another end of the securing rod. wherein the main body is capable of sliding along the securing rod between a locking position and a non-locking position, and when the main body is at the locking position, the main body moves to one end of the securing rod and pushes against the stopping portion to prevent wheels from rotating, and when the main body is at the non-locking position, the main body moves to another end of the securing rod to release the wheels.

3 Claims, 10 Drawing Sheets

82
81
51
821

BICYCLE PEDALS WITH LOCKING FUNCTION

BACKGROUND OF THE INVENTION

1. Field of the Invention

The present invention relates to bicycle pedals, and more particularly to bicycle pedals with locking function.

2. Description of the Related Art

Bicycling has become a very popular habit, which can provide transportation, exercise purpose and green fuel. Most of bicycles are equipped with shock absorbers for more comfort and safety.

However, thief issue is a serious problem for bicycle owners. Most of typical bicycle locks are extra accessories, which needs to be attached onto the bicycle. But during riding period, the bicycle lock might fall off the bicycle or damage the bicycle.

Please refer to FIG. 1 and FIG. 2. A locking device for a bicycle has a lockable pedal 10, a lock 12, and a U-shaped extendable frame 14. The lock 12 has a main body 16, a key hole 18 on the main body 16, a key 20, two through holes 22, 22' on the main body 16, and a pivoting shaft 24 on the main body 16. Another end of the pivoting shaft 24 is connected to a bicycle body 30 of the bicycle. The U-shaped extendable frame 14 has a handle 26, two extendable arms 28, 28' at two ends of the handle 26. Each extendable arm 28, 28' has an outer column 281 and an inner column 282, the outer column 281 is hollow, the inner column 282 is solid, and the inner column 282 is inserted in the outer column 281.

When the two extendable arms 28, 28' of the U-shaped extendable frame 14 of the lockable pedal 10 are respectively inserted through the wheel of the bicycle body 30 and the two through holes 22, 22' of the lock 12, the U-shaped extendable frame 14, the lock 12 and the bicycle body 30 are all locked together.

When a user places the U-shaped extendable frame 14 through the bicycle to be inserted into the lock 12 at another side of the bicycle, which is difficult when surrounding environment is dark. Furthermore, a gap between the U-shaped extendable frame 14 and the lock 12 might increases with time.

Moreover, each extendable arm 28, 28' respectively has the inner column 282 inserted in the outer column 281 for extension, however, weather weariness might cause corrosion on the surfaces of inner column 282 inserted in the outer column 281.

Therefore, it is desirable to provide bicycle pedals with locking function to mitigate and/or obviate the aforementioned problems.

SUMMARY OF THE INVENTION

An objective of the present invention is to provide bicycle pedals with locking function.

In order to achieve the above mentioned objective, the bicycle pedals with locking function includes a base and a securing member.

The base is positioned on a side of the bicycle and has a U-shaped main body and a through hole disposed at a central portion of the main body.

The securing member has a securing rod with an end attached to the bicycle and disposed through the through hole, and a stopping portion disposed at another end of the securing rod.

In one embodiment, the bicycle pedal further includes a crank member. The crank member comprising: a crank member. The crank member has a driving shaft and two crank rods respective connected to two sides of the driving shaft, and another end of the two crank rods is respectively pivotably connected to the two securing members.

The main body is capable of sliding along the securing rod between a locking position and a non-locking position, and when the main body is at the locking position, the main body moves to one end of the securing rod and pushes against the stopping portion to prevent wheels of the bicycle from rotating, and when the main body is at the non-locking position, the main body moves to another end of the securing rod to release the wheels of the bicycle.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
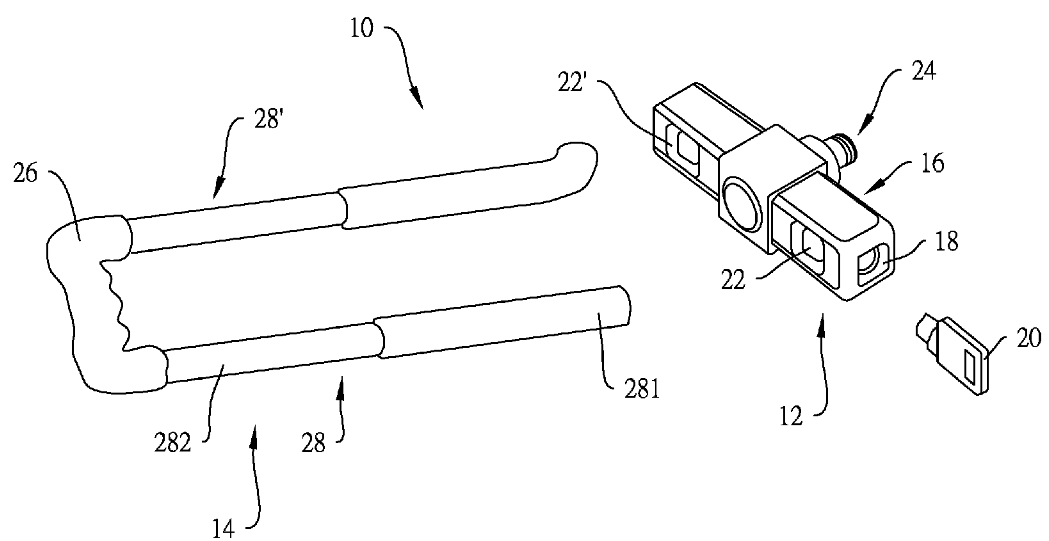
FIG. 1 is a schematic drawing of a prior art of lockable bicycle pedal.
Figure 2:
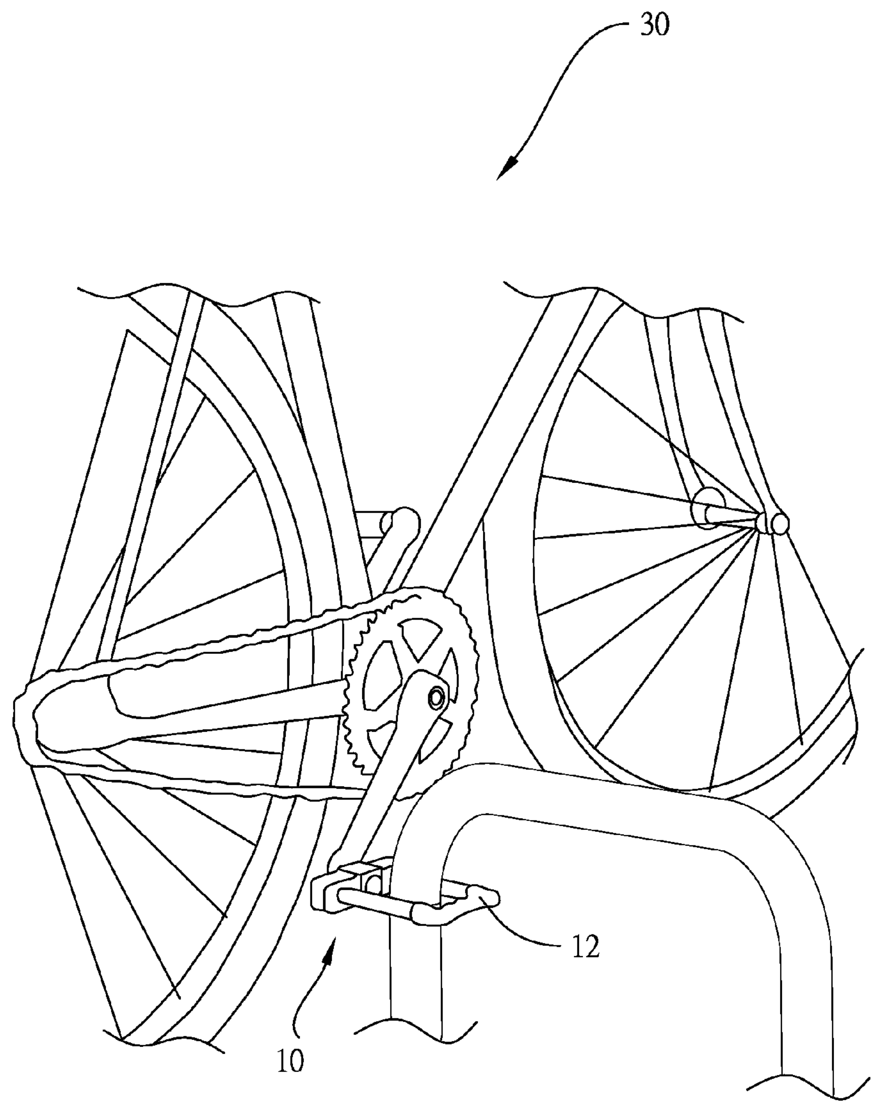
FIG. 2 is another schematic drawing of the prior art of lockable bicycle pedal.
Figure 3:
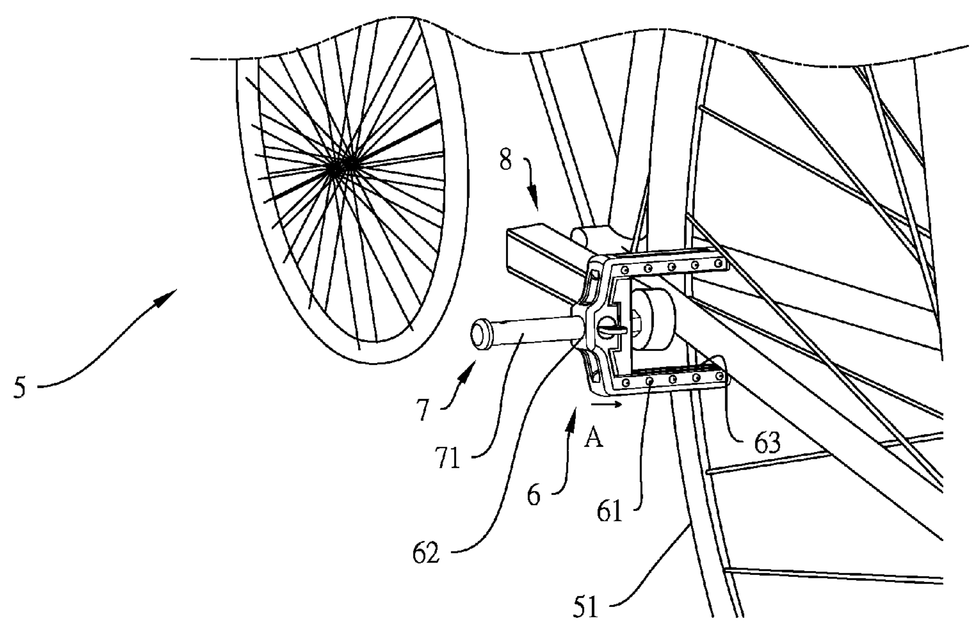
FIG. 3 is a perspective drawing of bicycle pedals with locking function according to a first embodiment of the present invention.
Figure 4:
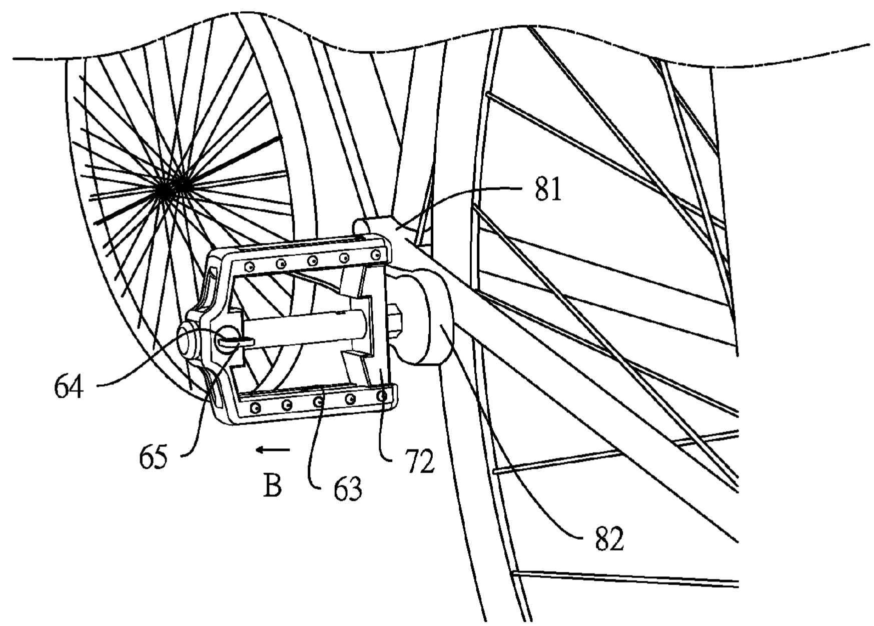
FIG. 4 is a schematic drawing showing the main body positioned at a non-locking position according to the first embodiment of the present invention.

Please refer to FIG. 3 and FIG. 4. A bicycle pedal with a locking function is positioned on one side of a bicycle 5, which is used for interfering with wheels 51 of the bicycle 5. The pedal comprises a base 6, a securing member 7 and a crank member 8.

The base 6 has a U-shaped main body 61, a through hole 62 disposed at a central portion of the main body 61, and two sliding slots 63 disposed on two opposite sides of the main body 61. The base 6 further comprises a key hole 64 disposed on the main body 61 to control movement of the main body 61 and a corresponding key 65. Alternatively, the key hole 64 is provided on the securing member 7.

Figure 5:
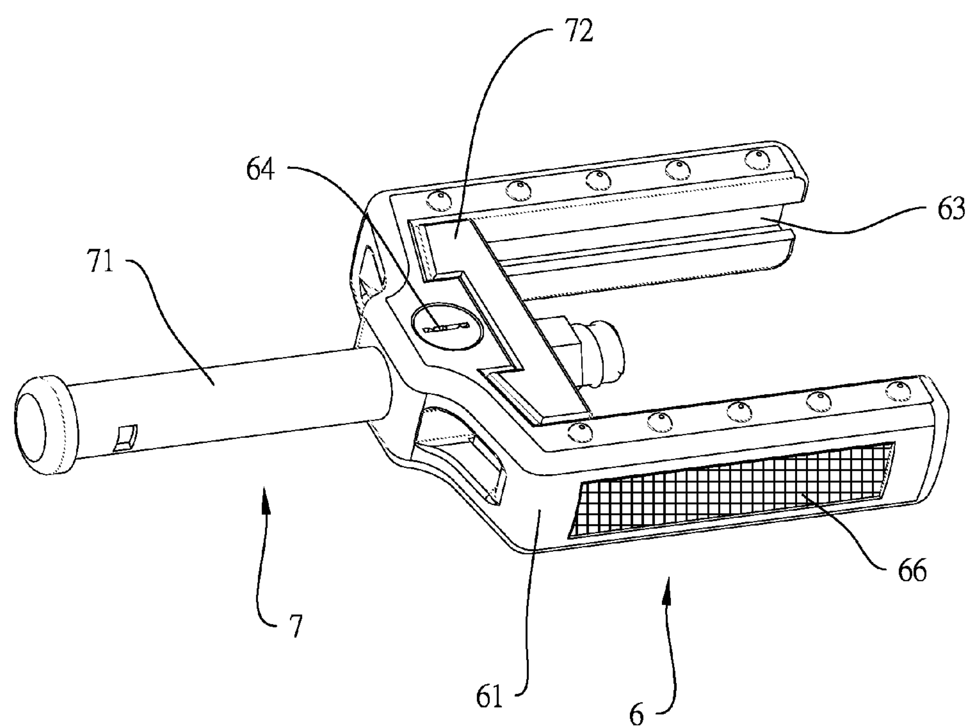
FIG. 5 is a local detail drawing showing the radiating element according to the first embodiment of the present invention.

Please refer to FIG. 5. The main body 61 further includes a detachable radiating element 66, in this embodiment, the radiating element 66 is a flash light equipped with batteries. When the user is riding the bicycle, he or she can active the radiating element 66 for warming purpose, and he or she can also detach the radiating element 66 from the main body 61 for illumination purpose.

The securing member 7 has a securing rod 71 with an end attached to the bicycle 5 and disposed through the through hole 62 of the base 6, and a stopping portion 72 disposed at another end of the securing rod 71. Both ends of the stopping portion 72 are respectively inserted into the two sliding slots 63 of the base 6.

The crank member 8 comprises a driving shaft 81 and two crank rods 82 respectively connected to two sides of the driving shaft 81. Another end of the two crank rods 82 is respectively pivotably connected to the two securing members rod 71.

Accordingly, in a first embodiment, the main body 61 slides along the securing rod 71 between a locking position A and a non-locking position B. When the main body 61 is at the locking position A, the main body 61 moves to one end of the securing rod 71 and pushes against the stopping portion 72 to prevent wheels of the bicycle 5 from rotating, and when the main body 61 is at the non-locking position B, the main body 61 moves to another end of the securing rod 71 to release the wheels of the bicycle 5. One sliding movement can lock or unlock the bicycle 5.

Figure 6:
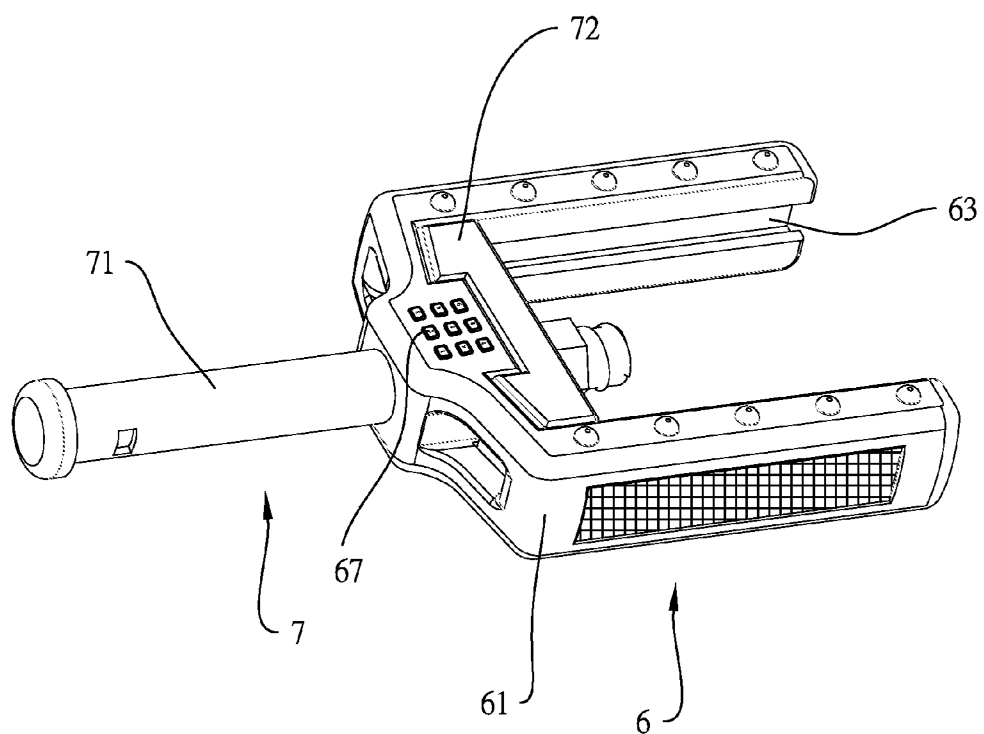
FIG. 6 is a perspective drawing of bicycle pedals with locking function according to a second embodiment of the present invention.

Please refer to FIG. 6. A second embodiment of the present invention is substantially similar with the first embodiment. The main difference in the second embodiment is, the main body 61 has a plurality of buttons 67 which provides digital locking function and replaces the key hole 64 and the corresponding key 65.

Figure 7:
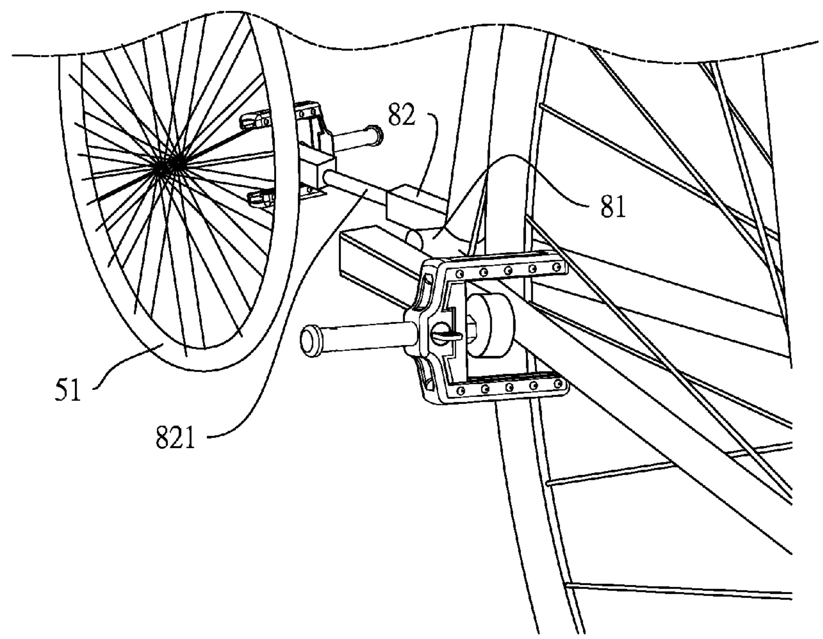
FIG. 7 is a perspective drawing of bicycle pedals with locking function according to a third embodiment of the present invention.

Please refer to FIG. 7. A third embodiment of the present invention is substantially similar with the first embodiment. The main difference in the third embodiment is, the crank rod 82 of the crank member 8 has an extendable rod 821 which allow both wheels 51 of the bicycle 5 are locked.

The extendable rod 821 is placed in the crank rod 82, when the 821 extendable rod 821 is pulled out, both of the crank rod 82 can be respectively moved to next to the two wheels 51, the main body 61 is able to slide along the securing rod 71 between the locking position A and the non-locking position B. When the main body 61 is at the locking position A, the main body 61 moves to one end of the securing rod 71 and pushes against the stopping portion 72 to prevent wheels of the bicycle 5 from rotating, and when the main body 61 is at the non-locking position B, the main body 61 moves to another end of the securing rod 71 to release the wheels of the bicycle 5.

Figure 8:
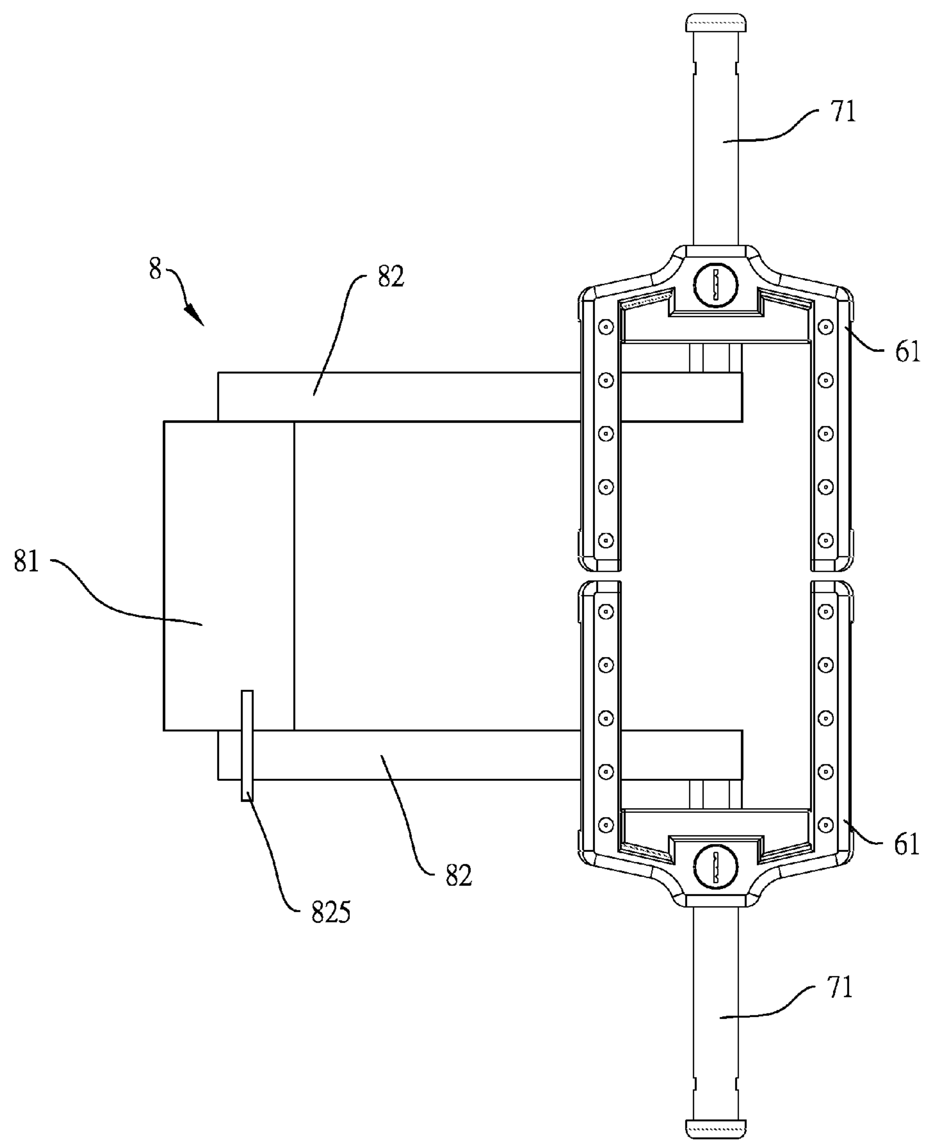
FIG. 8 is a local detail drawing showing bicycle pedals with locking function according to a fourth embodiment of the present invention.

Please refer to FIG. 8. A fourth embodiment of the present invention is substantially similar with the first embodiment. The main difference in the fourth embodiment is, any one of the crank rod 82 of the crank member 8 is capable of rotating around the driving shaft 81 and a limiting member 825 for controlling the rotation of the crank rod 82. When the two opposite crank rods 82 are rotated to become facing each other, the two main bodies 61 can respectively side along the ends of securing rod 71 to be adjacent to each other, and the limiting member 825 is utilized to limit the crank rod 82 to lock the wheels of the bicycle 5.

Figure 9:
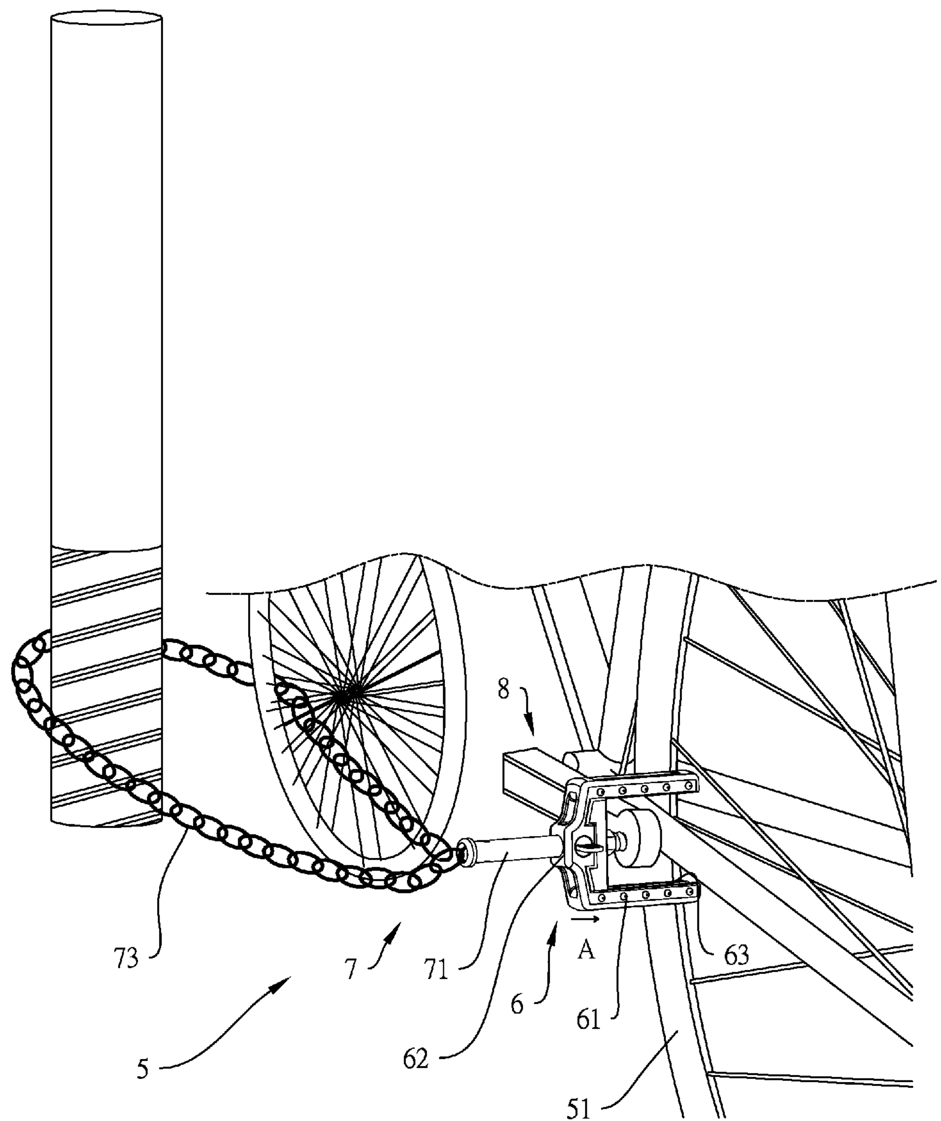
FIG. 9 is a perspective drawing of bicycle pedals with locking function according to a fifth embodiment of the present invention.
Figure 10:
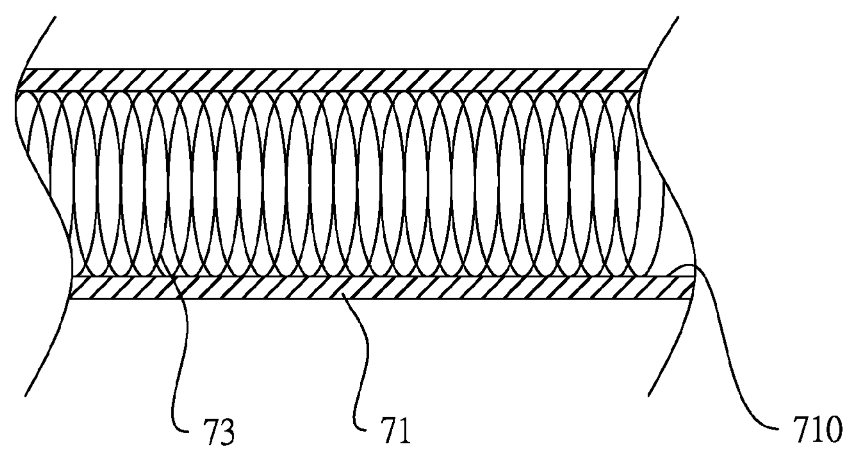
FIG. 10 is a local cross-section view showing the securing rod shown in FIG. 9 providing a space for a chain.

Please refer to FIG. 9. A fifth embodiment of the present invention is substantially similar with the first embodiment. The main difference in the fifth embodiment is, the securing member 7 further comprises a securing chain 73, which is configured to be stored a storage space 710 provided by in the securing rod 71. For further security for the bicycle 5, the chain 73 can be pulled out from the storage space 710 and attached to an unmovable object. With above-mentioned embodiments, following benefits can be obtained:

1. Designed as a part of the bicycle. Since every bicycle can be installed with the pedals with locking function, it reduces extra accessory requirement and no effect on the appearance of the bicycle.
2. Simple operation. The main body 61 slides along the securing rod 71 between a locking position A and a non-locking position B, which is much simpler operation compared with the prior art.
3. Providing extra illuminating and warming device. The main body 61 further includes a detachable radiating element 66, in this embodiment, the radiating element 66 is a flash light equipped with batteries. When the user is riding the bicycle, he or she can active the radiating element 66 for warming purpose, and he or she can also detach the radiating element 66 from the main body 61 for illumination purpose.
4. Different options for single wheel locking function or both wheels locking function. In one embodiment of the present invention, the extendable rod 821 is placed in the crank rod 82, when the 821 extendable rod 821 is pulled out, both of the crank rod 82 can be respectively moved to next to the two wheels 51.
5. Further protection. In one embodiment of the present invention, the securing member 7 further comprises a securing chain 73, which is configured to be stored a storage space 710 provided by in the securing rod 71. For further security for the bicycle 5, the chain 73 can be pulled out from the storage space 710 and attached to an unmovable object.
6. Multiple locking options any one of the crank rod 82 of the crank member 8 is capable of rotating around the driving shaft 81 and a limiting member 825 for controlling the rotation of the crank rod 82. When the two opposite crank rods 82 are rotated to become facing each other, the two main bodies 61 can respectively side along the ends of securing rod 71 to be adjacent to each other, and the limiting member 825 is utilized to limit the crank rod 82 to lock the wheels of the bicycle 5.

According to the above-mentioned, by controlling the main body 61 of the base 6 to interfere with the rotation the wheels 51, the bicycle 5 can be protected from being stolen. There is no need for extra security accessory.

Although the present invention has been explained in relation to its preferred embodiment, it is to be understood that many other possible modifications and variations can be made without departing from the spirit and scope of the invention as hereinafter claimed.

What is claimed is:

1. A bicycle pedal with a locking function comprising:

a respective base positioned on opposing sides of the bicycle, each base having a U-shaped main body comprising a central portion and a respective arm extending from opposing ends of the central portion, each arm comprising a sliding slot, a through hole disposed in the central portion of the main body;

a securing member for each base, each securing member having a securing rod with an end attached to, and extending away from, the bicycle and disposed through the through hole of the main body of the base, and a stopping portion disposed at another end of the securing rod, opposing ends of the stopping portion respectively slidably disposed in the sliding slots of the main body, wherein at least one of the securing rods comprises a storage space;

a crank member, the crank member having a driving shaft and two crank rods respectively connected to opposing sides of the driving shaft, another end of each crank rod respectively pivotably connected to one of the securing members, wherein at least one of the crank rods is extendible; and an extendable securing element for attaching to an object, the securing element disposable in the storage space;

wherein each main body is capable of sliding along the securing rod between a locking position and a non-locking position, the extendible crank rod is capable of extending between a locking position and a non-locking position, and when each main body is at the locking position, the main body moves to one end of the respective securing rod and the central portion abuts against the stopping portion to prevent a wheel of the bicycle from rotating, and when the main body is at the non-locking position, the main body moves to another end of the securing rod to release the wheel of the bicycle, and wherein at least one of the crank rods is rotatable around the driving shaft so that the main body connected to the at least one of the crank rods rotatable around the driving shaft is aligned to face the main body connected to the other crank rod, the crank member further comprising a limiting device for controlling rotation of the at least one of the crank rods rotatable around the driving shaft.

2. The bicycle pedal with a locking function as claimed in claim 1, wherein each base further comprises a key hole disposed on the main body to control movement of the main body and a corresponding key.

3. The bicycle pedal with a locking function as claimed in claim 1, wherein the main body further includes a detachable radiating element.

* * * * *